United States Patent [19]

Kock

[11] Patent Number: 4,645,622

[45] Date of Patent: Feb. 24, 1987

[54] ELECTRICALLY CONDUCTIVE CERAMIC MATERIAL

[75] Inventor: Wulf Kock, Markdorf, Fed. Rep. of Germany

[73] Assignee: Dornier System GmbH, Friedrichshafen, Fed. Rep. of Germany

[21] Appl. No.: 804,804

[22] Filed: Dec. 4, 1985

[30] Foreign Application Priority Data

Dec. 12, 1984 [DE] Fed. Rep. of Germany ....... 3445251

[51] Int. Cl.$^4$ .............................................. H01B 1/06
[52] U.S. Cl. ..................................... 252/521; 429/12; 429/224; 501/152
[58] Field of Search ................ 252/521; 501/152, 123; 429/12, 218, 224, 27, 29, 40

[56] References Cited

U.S. PATENT DOCUMENTS

| | | | |
|---|---|---|---|
| 4,197,362 | 4/1980 | Schmidberger et al. | 252/521 |
| 4,305,848 | 12/1981 | Hikita | 252/521 |
| 4,535,064 | 8/1985 | Yoneda | 252/521 |
| 4,562,124 | 12/1985 | Ruka | 252/521 |

*Primary Examiner*—Josephine L. Barr
*Attorney, Agent, or Firm*—Ralf H. Siegemund

[57] ABSTRACT

Electrically conductive ceramic having the composition $La_xCa_yMnO_{3+\Delta}$ characterized by $x=0.44$ to $0.48$, $Y=0.42$ to $0.50$ and the sum of the mol numbers of La and Ca is between 1 to 15% (preferably about 10%) smaller than the mol number of Mn.

3 Claims, No Drawings

ELECTRICALLY CONDUCTIVE CERAMIC MATERIAL

BACKGROUND OF THE INVENTION

The present invention relates to an electrically conductive ceramic material which can be used under corrosive or oxidizing environmental conditions and even at temperatures around 1300 degrees C.

High temperature vapor phase electrolysis or the operation of high temperature fuel cells employment of low resistive electrodes having a low transition resistance to the electrolyte. These electrodes have to maintain their properties even in an oxidizing environment as well as in a high temperature environment. Aside from resistance against high temperature and agression from oxidizing gases the particular material involved should have as high an electrical conductivity as possible. It should also be not too expensive and it should be able to withstand cyclically occurring thermal loads. In addition these electrodes should not be prone to develop high resistive (ohmic) surface strata or coatings because only low voltages are to be extracted from these electrodes.

The known noble metals fulfill all but one of these requirements and it is obvious on its face that they are quite expensive and therefore do not meet the particular requirement of eceonomy. Alternatively ceramic materials are known which conduct electricity quite well. Known here are molybdenum silicite or silicon carbide. Unfortunately under oxidizing conditions these materials develop high ohmic surface covers or coatings just like conventional heating conductor alloys. Also, the transition resistance between electrode and electrolyte is so high that for low voltage drops within the system the electrodes pose unusable conditions.

Another alternative to noble metals are the so called conductive or electrically conductive oxide ceramic materials. From a conductivity point of view they constitute a second choice because their conductivity generally is quite below the conductivity of noble metals. On the other hand this kind of ceramic is of advantage if within a particular construction and compound arrangement involving other ceramic materials one can provide matching of the respective thermal coefficient of extension. Known members of this type of electrically conductive ceramics are the mixed oxides which crystallize in a lattice structure known as Perowskit lattice, wherein a transition material is embedded in a cation substrate lattice—the so called B lattice, is the transition metal having two different levels. High electrical conductivity is observed in the quasi binary systems such as $LaMnO_3$—$CaMnO_3$; $LaCoO_3$—$SrCoO_3$; $LaCrO_3$—$LaNiO_3$ or $LaNiO_3$—$CaNiO_3$.

German printed patent application No. 27 35 934 (see also U.S. Pat. No. 4,197,362) discloses a material having a composition which can generally be described as $La_xCa_{1-x}MnO_{3+\Delta}$. These materials are very good conductors. The quantity delta adjusts itself for a given composition of the cation as a function of the partial pressure of oxygen and of the temperature and varies depending on the environmental conditions between about $-0.25$ and $+0.25$.

DESCRIPTION OF THE INVENTION

It is an object of the present invention to provide a new and improved oxide ceramic having a higher electrical conductivity than the known ceramic materials and which in addition meets the following requirements:

the oxide ceramic must have a high resistance against high temperatures within this range outlined earlier. Also, the material must be resistive against oxidized gases, against cyclically varying high temperatures, must not form high resistive surface covers or coatings and should be economical.

In accordance with the preferred embodiment of the present invention such a ceramic material should have the composition $La_xCa_yMnO_{3+\Delta}$ wherein x varies from 0.44 to 0.48; y varies from 0.42 to 0.50 and the sum of the mol numbers of La and Ca is smaller by a value from 1 to 15% than the mol number of the manganese. Preferably the mol numbers of La and Ca are between 8 and 12% smaller than the mol number of the manganese whereby particularly 10% is a preferred form of practicing the invention.

Therefore the novel material is specifically characterized by the fact that the so called A lattice of La and Ca is not completely occupied. It was found surprisingly that in accordance with the invention the ratio of the two mol numbers is not stoichiometric and this fact is deemed to contribute or even establish a high electrical conductivity. This is so even though the conductivity of these materials is attributable to the transition metal in the B lattice and whose valency which varies here between 3 and 4. The inventive material therefore fulfills all of the objects and requirements mentioned above whereby in addition it is an advantageous feature that the coefficient of extension is easily matched with those of other ceramics. Moreover the ceramic is not only significantly electrically conductive at elevated temperatures, but also at room temperature. The first four lines in the following table yield specific compositions of our different ceramic materials as well as the mol ratio formed from the sum of the mol numbers of La and Ca, and the mol number of manganese. The final column indicates specific conductivity in air at 1000 degrees C. (being the inverse of ohm-centimeter).

Underneath and for purposes of comparison three further compositions are given which basically are also composed of La, Ca, $MnO_3$ but which do not meet the inventive conditions particularly as far as the mol ratios are concerned. It is seen that in spite of the seemingly small differences involved here the conductivity drops significantly.

|  | mols La + Ca / mols Mn | $\Omega^{-1} \cdot Cm^{-1}$ |
| --- | --- | --- |
| $La_{0.44}Ca_{0.42}MnO_{3+\Delta}$ | 0.86 | 260 |
| $La_{0.46}Ca_{0.43}MnO_{3+\Delta}$ | 0.89 | 290 |
| $La_{0.48}Ca_{0.43}MnO_{3+\Delta}$ | 0.91 | 265 |
| $La_{0.46}Ca_{0.5}MnO_{3+\Delta}$ | 0.96 | 267 |
| $La_{0.56}Ca_{0.5}MnO_{3+\Delta}$ | 1.06 | 180 |
| $La_{0.52}Ca_{0.59}MnO_{3+\Delta}$ | 1.11 | 128 |
| $La_{0.66}Ca_{0.46}MnO_{3+\Delta}$ | 1.12 | 122 |

The invention is not limited to the embodiments described above but all changes and modifications thereof, not constituting departures from the spirit and scope of the invention, are intended to be included.

I claim:

1. Electrically conductive ceramic having the composition $La_xCa_yMnO_{3+\Delta}$ characterized by x=0.44 to 0.48, y=0.42 to 0.50 and the sum of the mol numbers of La and Ca is between 1 to 15% smaller than the mol number of Mn.

2. Ceramic as in claim 1 wherein the mol number of La and Ca is between 8 and 12% smaller than the mol number of Mn.

3. Ceramic as in claim 2 wherein the combined mol numbers of La and Ca is smaller by 10% than the mol number of Mn.

* * * * *